US009938127B2

(12) United States Patent
Kuehl et al.

(10) Patent No.: US 9,938,127 B2
(45) **Date of Patent: *Apr. 10, 2018**

(54) BEVERAGE SYSTEM ICE MAKER AND ICE AND WATER RESERVOIR

(71) Applicant: Whirlpool Corporation, Benton Harbor, MI (US)

(72) Inventors: Steven Kuehl, Stevensville, MI (US); Marcos Heinzle, Joinville (BR); Gustavo Lazzaris de Bona, Joinville (BR); Nihat Cur, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 39 days.

This patent is subject to a terminal disclaimer.

(21) Appl. No.: 14/875,329

(22) Filed: Oct. 5, 2015

(65) Prior Publication Data

US 2016/0023882 A1 Jan. 28, 2016

Related U.S. Application Data

(63) Continuation of application No. 13/832,669, filed on Mar. 15, 2013, now Pat. No. 9,150,400.

(51) Int. Cl.
*B64D 1/08* (2006.01)
*B01F 3/04* (2006.01)
*B67D 1/08* (2006.01)

(52) U.S. Cl.
CPC ........ *B67D 1/0861* (2013.01); *B01F 3/04815* (2013.01); *B67D 1/0859* (2013.01)

(58) Field of Classification Search
CPC ...... B67D 1/0861; B67D 1/0859; B67D 1/08; B67D 1/0857; B67D 1/0406; B01F 3/04815; B01F 3/04; B01F 15/065
(Continued)

(56) References Cited

U.S. PATENT DOCUMENTS 2,774,229 A * 12/1956 Thau ........................ B67D 1/04 222/146.6
3,200,610 A 8/1965 Van Steenburgh, Jr.
(Continued)

FOREIGN PATENT DOCUMENTS

EP 1088748 A2 4/2001
EP 2070586 A1 6/2009
(Continued)

OTHER PUBLICATIONS

International Application No. PCT/US201423454, filed Mar. 11, 2014, Applicant, Whirlpool Corporation, International Search and Written Opinion, dated May 29, 2014.
(Continued)

*Primary Examiner* — Mohammad M Ali
(74) *Attorney, Agent, or Firm* — Price Heneveld LLP

(57) ABSTRACT

A beverage dispensing apparatus including a storage tank. At least one ice body is formed proximate the top portion of the storage tank. The ice body is formed in an icemaker configured to produce an ice body through direct contact with an evaporator coil and does not use cold air, or formed directly on a portion of the top portion of the storage tank using evaporator coils extending around a perimeter of the storage tank. The water is then configured to be carbonated and then dispensed to a user upon a user command.

18 Claims, 4 Drawing Sheets

(58) Field of Classification Search
USPC ............. 62/391, 394, 306, 30; 222/1, 146.6; 99/323.2
See application file for complete search history.

(56) References Cited

U.S. PATENT DOCUMENTS

| | | | |
|---|---|---|---|
| 3,252,424 A | 5/1966 | Van Steenburgh, Jr. | |
| 4,759,474 A | 7/1988 | Regunathan et al. | |
| 4,764,315 A | 8/1988 | Brusa | |
| 5,184,942 A | 2/1993 | Deininger et al. | |
| 5,399,300 A | 3/1995 | Notar | |
| 5,413,742 A | 5/1995 | Gatter | |
| 5,422,045 A | 6/1995 | Notar et al. | |
| 5,443,763 A | 8/1995 | Notar | |
| 5,464,124 A | 11/1995 | Weyh et al. | |
| 5,474,717 A | 12/1995 | Bucher et al. | |
| 5,732,563 A | 3/1998 | Bethuy et al. | |
| 5,792,391 A | 8/1998 | Vogel et al. | |
| 5,987,897 A | 11/1999 | Hall | |
| 5,987,900 A | 11/1999 | Love | |
| 6,220,047 B1 | 4/2001 | Vogel et al. | |
| 6,240,734 B1 | 6/2001 | Ferrier et al. | |
| 6,324,911 B1 | 12/2001 | Scarffe | |
| 6,339,930 B2 | 1/2002 | Horey et al. | |
| 6,449,966 B1 | 9/2002 | Bethuy et al. | |
| 6,581,391 B2 | 6/2003 | Horey et al. | |
| 6,644,343 B2 | 11/2003 | Bethuy et al. | |
| 6,662,573 B2 | 12/2003 | Hawkins, Jr. et al. | |
| 6,854,282 B2 | 2/2005 | Bethuy et al. | |
| 6,889,598 B2 | 5/2005 | Wroblewski | |
| 6,896,159 B2 | 5/2005 | Crisp, III et al. | |
| 7,021,077 B2 | 4/2006 | Schroeder | |
| 7,080,525 B2 | 7/2006 | McCann et al. | |
| 7,114,707 B2 | 10/2006 | Rona et al. | |
| 7,146,818 B2 | 12/2006 | Hawkins, Jr. et al. | |
| 7,269,960 B2 | 9/2007 | Elsom et al. | |
| 7,416,170 B2 | 8/2008 | Jablonski et al. | |
| 7,861,550 B2 | 1/2011 | Knoll et al. | |
| 8,103,378 B2 | 1/2012 | Crisp, III | |
| 8,341,975 B2 | 1/2013 | Knoll et al. | |
| 8,495,893 B2 | 7/2013 | Alajimi | |
| 8,561,839 B2 | 10/2013 | Cocchi et al. | |
| 2003/0066306 A1* | 4/2003 | Renken | B67D 1/0857 62/390 |
| 2003/0080443 A1 | 5/2003 | Bosko | |
| 2003/0101735 A1 | 6/2003 | Teague et al. | |
| 2004/0216474 A1 | 11/2004 | Jablonski et al. | |
| 2005/0011910 A1* | 1/2005 | McCann | B67D 1/0021 222/146.6 |
| 2006/0207271 A1 | 9/2006 | Elsom et al. | |
| 2011/0068128 A1 | 3/2011 | Knoll et al. | |
| 2011/0079612 A1 | 4/2011 | Knoll et al. | |

FOREIGN PATENT DOCUMENTS

| | | |
|---|---|---|
| GB | 2026880 A | 2/1980 |
| WO | 0015543 A1 | 3/2000 |

OTHER PUBLICATIONS

European Search Report dated Oct. 5, 2016, for International Application No. PCT/US2014/023454, filed Mar. 11, 2014.

* cited by examiner

BEVERAGE SYSTEM ICE MAKER AND ICE AND WATER RESERVOIR

CROSS-REFERENCE TO RELATED APPLICATIONS

This application is a continuation of U.S. patent application Ser. No. 13/832,669, entitled BEVERAGE SYSTEM ICE MAKER AND ICE AND WATER RESERVOIR, filed on Mar. 15, 2013, now U.S. Pat. No. 9,150,400, the entire disclosure of which is incorporated by reference.

FIELD OF THE INVENTION

The present invention generally relates to a beverage dispensing apparatus and a method for constructing therefore.

SUMMARY OF THE INVENTION

One aspect of the present invention includes a beverage dispensing apparatus having a liquid inlet configured to receive water from a water source. A storage tank receives water from the liquid inlet and the storage tank has a top portion and a bottom portion. At least one ice body is located proximate the top portion of the storage tank and at least the bottom portion of the storage tank is free of ice. The ice body is formed in an icemaker which is configured to produce an ice body through direct contact with an evaporator coil and does not use cold air or is formed directly on a portion of the top portion of the storage tank using evaporator coils extending around a perimeter of the storage tank. The water is then pumped by a pump from the bottom portion of the storage tank, through a carbonator, where the water is then dispensed to a user, upon a command.

Another aspect of the present invention includes a beverage dispensing apparatus having a liquid inlet which receives water from a water source and provides that water to a storage tank having a top portion and a bottom portion. At least one ice body is formed proximate the top portion of the storage tank. At least the bottom portion of the storage tank is free of ice. The ice body is formed in an icemaker which is configured to produce an ice body through direct contact with an evaporator coil or is formed directly on a portion of the top portion of the storage tank using evaporator coils extending around a perimeter of the storage tank. A pump is configured to pump the water from the bottom portion of the storage tank to a user upon user command.

Yet another aspect of the present invention includes a method for producing a beverage. First, a liquid inlet is provided and configured to receive water from a water source. Next, water is received into a storage tank from the liquid inlet, wherein the storage tank has a top portion and a bottom portion. Next, at least one ice body is formed proximate the top portion of the storage tank where the bottom portion of the storage tank is free of ice. Then at least one ice body is formed in an icemaker configured to produce an ice body through direct contact with an evaporator coil not using cold air or formed directly on a portion of the top portion of the storage tank using evaporator coils extending around a perimeter of the storage tank. Finally, the water is pumped from the bottom portion of the storage tank and dispensed to a user upon a user command.

These and other features, advantages, and objects of the present invention will be further understood and appreciated by those skilled in the art by reference to the following specification, claims, and appended drawings.

DETAILED DESCRIPTION

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

Figure 1:
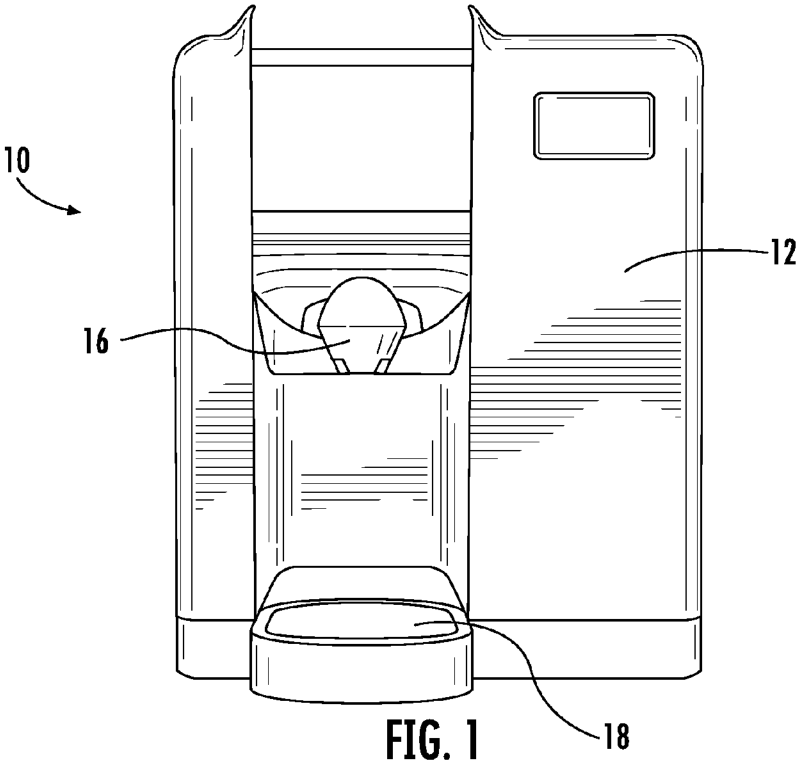
FIG. 1 is a front plan view of the beverage dispensing apparatus of the present invention.
Figure 2:
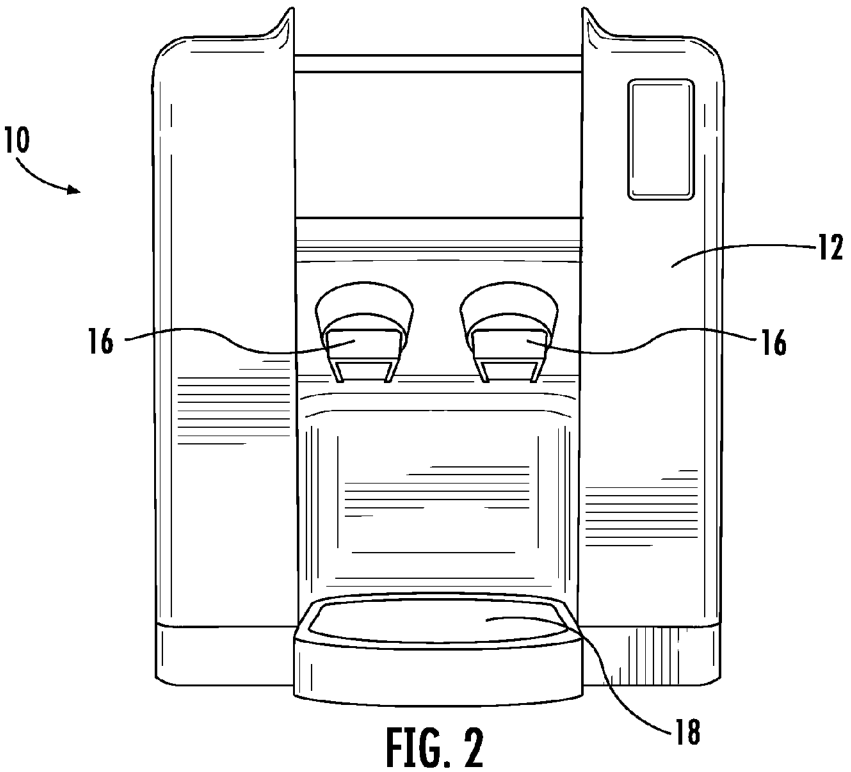
FIG. 2 is a front plan view of another embodiment of the beverage dispensing apparatus of the present invention.
Figure 3:
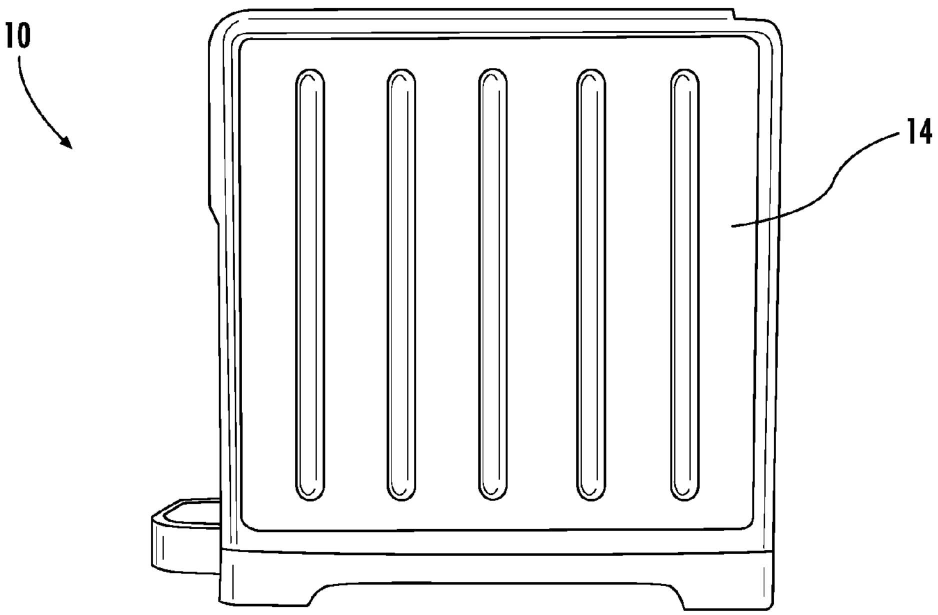
FIG. 3 is a side plan view of the beverage dispensing apparatus of the present invention.

As shown in FIG. 1, reference number 10 generally designates a beverage dispensing apparatus. FIG. 1 further shows the front surface 12 of the beverage dispensing apparatus 10 and the dispenser 16 which is configured to dispense the water or carbonated and non-carbonated beverages to a user. Additionally, the beverage dispensing apparatus 10 includes a cup holder portion 18 configured to receive at least one beverage-holding container from a user. FIG. 2 shows another embodiment of the beverage dispensing apparatus 10 having multiple dispensers 16 each configured to dispense different types of water and carbonated or non-carbonated beverages from the apparatus 10. The apparatus 10 is configured to produce ice, chilled water, ambient water, hot water, carbonated water, carbonated beverages, non-carbonated beverages or any combination thereof. FIG. 3 shows the back surface 14 of a beverage dispensing apparatus 10. The liquid inlet is connected to fluid conduits.

Figure 4:
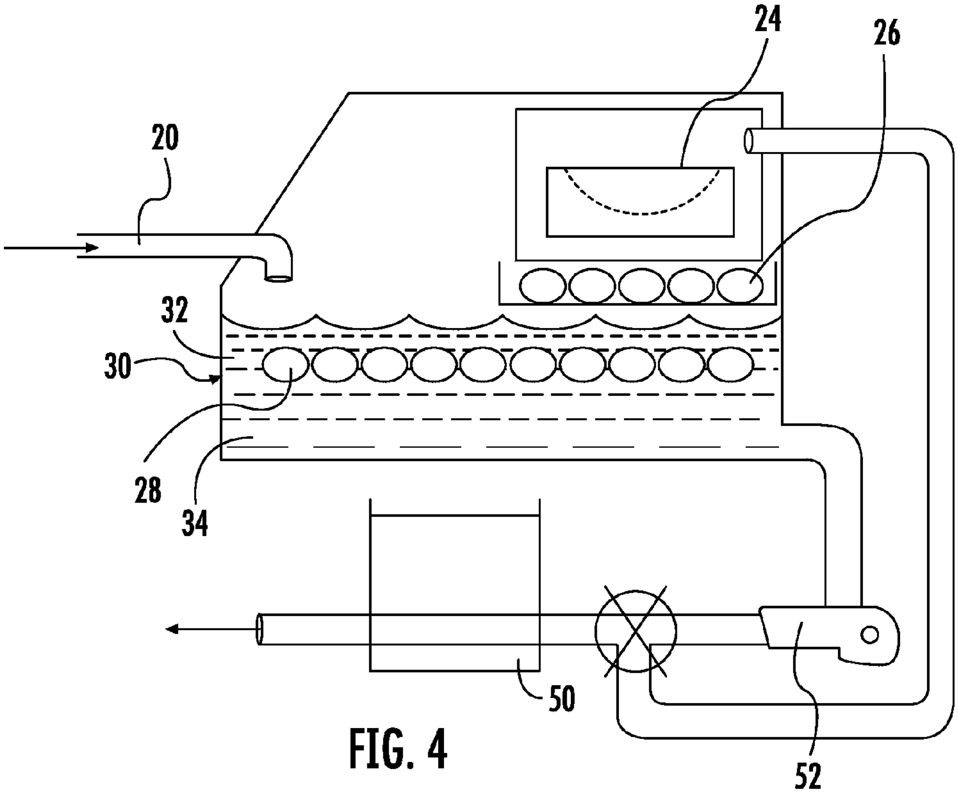
FIG. 4 is a schematic view of the beverage dispensing apparatus of the present invention.

FIG. 4 shows the storage tank 30 configured to provide water to a user upon command. The beverage dispensing apparatus 10 generally includes a liquid inlet 20 configured to receive water from a water source and a storage tank 30 that receives water from the liquid inlet 20 and has a top portion 32 and a bottom portion 34. Alternately, the storage tank can be filled manually if water is not plumbed-in. The apparatus 10 further includes at least one ice body 28 disposed proximate the top portion 32 of the storage tank 30 and at least the bottom portion 34 of the storage tank 30 is at least mostly or substantially free of ice. The ice body 28 is formed in an icemaker 24 which is configured to produce an ice body 28 through direct contact with an evaporator coil 26 and does not use cold air. The ice body 28 may also be formed directly on a portion of the top portion 32 of the storage tank 30 using evaporator coils 26 which extend around the exterior of the perimeter 36 of the storage tank 30. The evaporator is typically connected to a compressor system configured to provide cooling to the evaporator. The apparatus 10 further includes a carbonator 50 configured to produce carbonated water, and a pump 52 configured to pump the water from the bottom portion 34 of the storage tank 30 through the carbonator 50 and to dispense the water to a user upon a user command or based upon user input such as pushing a button on the apparatus 10.

The storage tank 30 receives water (preferably filtered but can also be unfiltered) from a water source and is configured to insert that water into the storage tank 30. The water source provided to the inlet 20 can be a plumbed water line or a water reservoir or the storage tank can be filled manually. In the embodiment shown in FIG. 4, the icemaker 24 is disposed proximate to the storage tank 30 and configured to produce at least one ice body 28 by using recirculated water from the bottom portion 34 of the storage tank 30. The icemaker 24 includes evaporator coils 26 in order to further cool the water and produce at least one ice body 28. The ice maker 24 does not use cold air during the production of the ice bodies 28. Additionally, the icemaker 24 is also configured to provide the at least one ice body directly to a user upon user command.

The storage tank 30 is typically comprised of a plastic polymer and typically includes double walled insulation but it is contemplated that the storage tank 30 may be comprised of any other material such as a stainless steel but thermally insulated so there is no condensation on the external walls of storage tank. The storage tank 30 has a top portion 32 and a bottom portion 34 where ice 28 is received in the top portion 32 of the storage tank 30 and the bottom portion 34 of the tank 30 is at least mostly or substantially free from ice 28 due to buoyancy of the ice. Moreover, the icemaker 24 is configured to maintain the water disposed in the bottom portion 34 of the storage tank 30 at the coldest possible temperature without freezing, in the case of water about 32° F. Additionally, the bottom portion 34 of the storage tank 30 is free from components that remove heat. When desired by a user, the water from the bottom portion 34 of the storage tank 30 is pumped out of the storage tank, through a carbonator 50, and then dispensed to a user either as chilled, carbonated water or mixed with a beverage syrup to become a carbonated beverage. The beverage dispensing apparatus 10 is further configured to provide ambient temperature water directly to a user or to provide chilled non-carbonated water to a user or to provide cold non-carbonated beverages, upon user command.

The carbonator 50 is typically an in-line, on demand carbonator, such as proposed by pending patent application US20110268845, now U.S. Pat. No. 8,567,767, the disclosure of which is hereby incorporated in its entirety, but it is contemplated that the inline carbonator 50 may be disposed in the storage tank 30. Typically, the carbonator 50 includes two inlets; one for the cold water (which is pressurized by a pump 52, typically a high pressure water pump) and one for $CO_2$ gas. Downstream to the carbonator, there is also a flow control device (not shown) on the carbonator outlet line to adjust the water flow rate. The $CO_2$ pressure is typically from about 3 to about 10 psi (or from 3 to 10 psi) higher than the water pressure but that range can vary depending on the type of in-line carbonator used.

Figure 5:
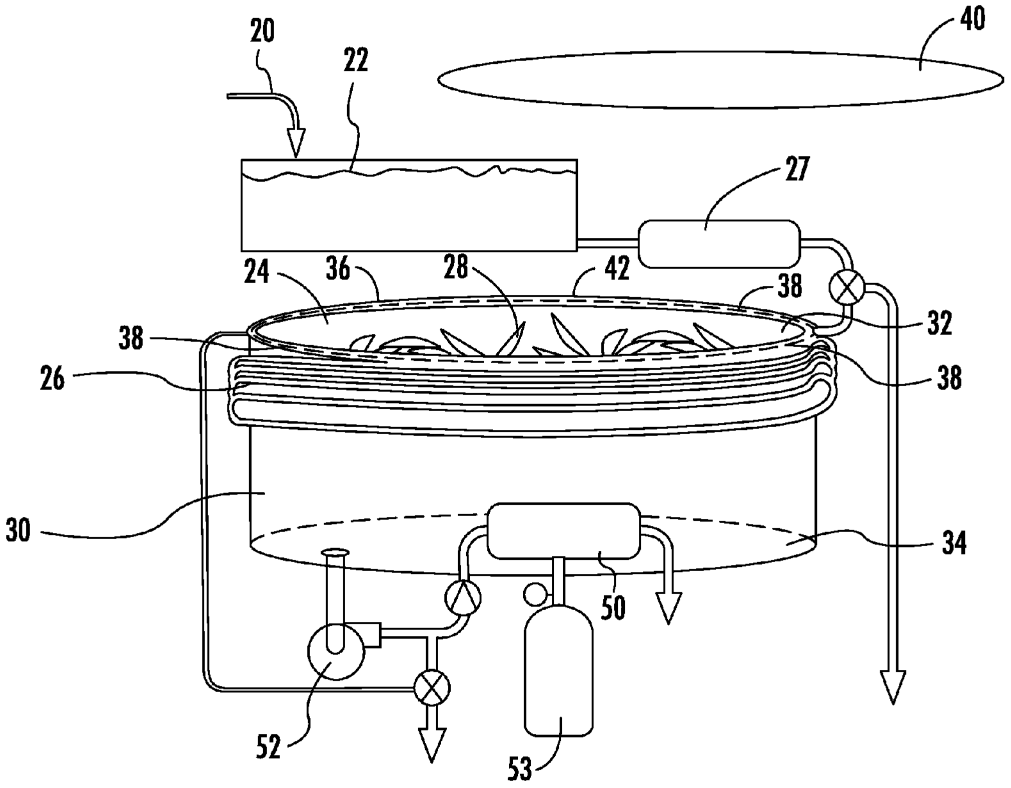
FIG. 5 is a schematic view of another embodiment of the beverage dispensing apparatus of the present invention.

FIG. 5 shows another embodiment of the beverage dispensing apparatus 10 of the present invention. The apparatus 10 includes an inlet reservoir 22 or water source which inserts water into the storage tank 30 through filter 27. The water source may be a plumbed water line or a water reservoir that may be automatically or manually filled. The storage tank 30 has a top portion 32 and a bottom portion 34 as well as a perimeter 36. An icemaker 24 is disposed proximate the top portion 32 of the storage tank 30. Moreover, the icemaker 24 may be disposed in the top portion 32 of the storage tank 30, wherein the top portion 32 of the storage tank 30, which is located above or extending to the water line, is converted to a vertical wall icemaker 24. The top portion 32 of the storage tank 30 includes externally wrapped evaporator coils 26 disposed around the perimeter 36 of the top portion 32 of the storage tank 30. Additionally, the perimeter 36 of the storage tank 30 typically includes a manifold 42 having a plurality of liquid inlets 38 spaced circumferentially about the perimeter 36 which provide water to the icemaker 24 and the interior of the storage tank 30. Moreover, the manifold 42 may be located about a perimeter of a tank lid 40. The water disposed out of the liquid inlets 38 is configured to flow radially inward about the perimeter contacting the inner wall of tank 30 in top portion 32. The icemaker's 24 water source is recirculated water from the bottom portion 34 of the storage tank 30 or water directly from the appliance's water source. The manifold 42 can be configured to have weaker or no flow from the liquid inlets 38 at certain points in order to create an uneven thickness in the ice ring. This allows for places in the ice ring to crack under pressure of expansion against the tank 30 so that ice bodies 28 fall into the chilled water located in the storage tank 30 below. Moreover, the ice layer could be detected by a proximity switch, capacitated sensor, or temperature sensor. Once an adequate layer of ice is formed, the water inlet continues raising the water level to melt the ice layer which causes the ice bodies 28 to fall into and mix with the water of the storage tank 30. Alternatively, the ice bodies 28 could be harvested by a hot gas defrost system.

The icemaker 24 is configured to maintain the water in the storage tank 30 at the coldest possible temperature without freezing, in the case of water about 32° F. Upon a user command, water from the bottom portion 34 of the storage tank 30 is pumped out of the storage tank 30 and optionally through a carbonator 50 where it is then dispensed to a user either in the form cold carbonated water or as cold, carbonated beverages after being mixed with a beverage syrup or ingredient. Additionally, the beverage dispensing apparatus 10 of this embodiment is configured to provide chilled still or cold carbonated water or cold non-carbonated beverages, or any combination thereof directly to a user upon a user command. Alternatively, the storage tank 30, being be made of a metal such as stainless steel, can be pressurized with $CO_2$ gas to provide a traditional batch carbonation system for supplying chilled carbonated water and carbonated beverage upon a user command.

Figure 6:
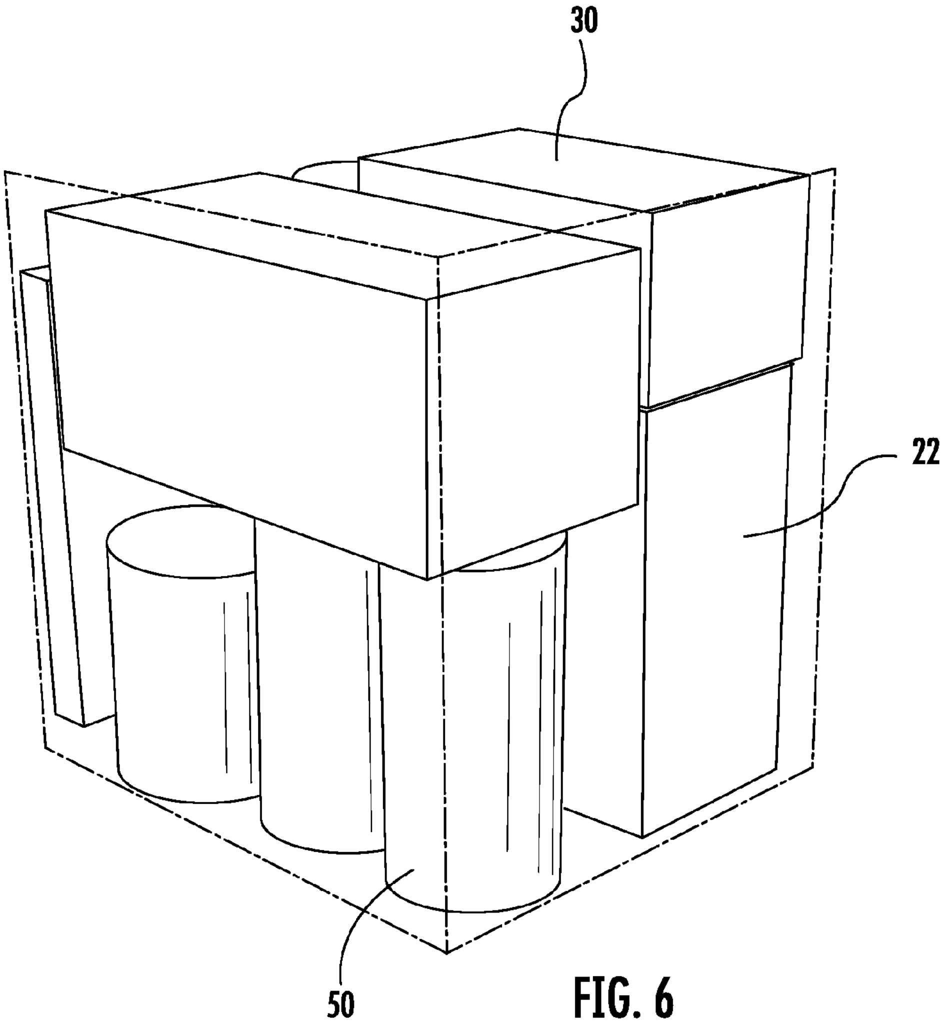
FIG. 6 is a side perspective view of the beverage dispensing apparatus of the present invention.
Figure 7:
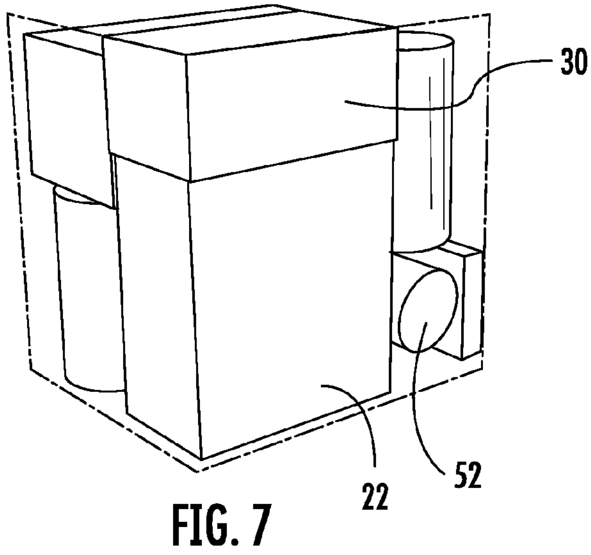
FIG. 7 is an opposite side perspective view of the beverage dispensing apparatus of the present invention.

FIGS. 6 and 7 show schematic locations of each of the elements of the beverage dispensing apparatus 10. As shown in FIGS. 6 and 7, the icemaker and the storage tank are typically disposed in a top portion of the beverage dispensing apparatus 10. The configuration shown in FIGS. 6 and 7 is an exemplary embodiment only and is not meant to show every possible configuration of the beverage dispensing apparatus 10.

In home beverage systems, the quality of the beverage, carbonation levels, number of successive beverage dispensing without compromising the beverage quality and the overall beverage experience are important problems to solve along with cost, size and footprint of such countertop appliances. This invention will provide a superior water conditioning system for Home Beverage appliances to deliver high quality cold carbonated and non-carbonated beverages matching or exceeding consumer beverage experience from commercially made beverages in cans and bottles. The invention allows a water chilling sub-system which will provide ample amounts of coldest water for high quality carbonation in the most compact footprint at a substantially lower cost.

What is claimed is:

1. A beverage dispensing apparatus comprising:
- a liquid inlet configured to receive water from a water source;
- a storage tank that receives water from the liquid inlet and having a top portion and a bottom portion;
- at least one ice body proximate the top portion of the storage tank, and wherein the at least one ice body is formed in an icemaker configured to produce an ice body through direct contact with an evaporator coil and does not use cold air, or formed directly on a portion of the top portion of the storage tank using evaporator coils extending around a perimeter of the storage tank;
- a carbonator configured to produce carbonated water received via a fluid conduit from the storage tank; and
- a pump configured to pump the water from the bottom portion of the storage tank, through the carbonator, and to dispense the water or a carbonated beverage to a user, upon a user command.

2. The beverage dispensing apparatus of claim 1, wherein the storage tank is comprised of a plastic polymer and the storage tank is a double-walled insulated storage tank.

3. The beverage dispensing apparatus of claim 1, wherein the carbonator is an in-line, on demand carbonator.

4. The beverage dispensing apparatus of claim 1, wherein the icemaker is configured to dispense the at least one ice body directly to a user.

5. The beverage dispensing apparatus of claim 1, wherein water from the bottom portion of the storage tank is dispensed directly to the user, without passing through the carbonator.

6. The beverage dispensing apparatus of claim 1, wherein at least the bottom portion of the storage tank is mostly free of ice.

7. The beverage dispensing apparatus of claim 1, wherein the top portion of the storage tank includes a plurality of liquid inlets disposed about a perimeter of the storage tank and configured to dispense water radially inward.

8. The beverage dispensing apparatus of claim 1, wherein the storage tank is configured to maintain the water in the bottom portion of the tank at a coldest possible temperature without freezing.

9. The beverage dispensing apparatus of claim 1, wherein the bottom portion of the storage tank is free from a component that removes heat.

10. A beverage dispensing apparatus comprising:
- a liquid inlet configured to receive water from a water source;
- a storage tank that receives water from the liquid inlet and having a top portion and a bottom portion;
- at least one ice body proximate the top portion of the storage tank, and wherein the at least one ice body is formed in an icemaker configured to produce an ice body through direct contact with an evaporator coil and does not use cold air, or formed directly on a portion of the top portion of the storage tank using evaporator coils extending around a perimeter of the storage tank; and
- a pump configured to pump the water from the bottom portion of the storage tank, to a user, upon a user command.

11. The beverage dispensing apparatus of claim 10, wherein the top portion of the storage tank includes a plurality of liquid inlets disposed about a perimeter of the storage tank and configured to dispense water radially inward.

12. The beverage dispensing apparatus of claim 10, wherein the storage tank is configured to maintain the water in the bottom portion of the storage tank at a coldest possible temperature without freezing.

13. The beverage dispensing apparatus of claim 10, wherein the bottom portion of the storage tank is free from a component that removes heat.

14. A method for producing a beverage comprising the steps of:
- providing a liquid inlet configured to receive water from a water source;
- receiving water into a storage tank from the liquid inlet, wherein the storage tank has a top portion and a bottom portion;
- forming at least one ice body proximate the top portion of the storage tank, wherein the bottom portion of the storage tank is mostly free of ice; and where at least one ice body is formed in an icemaker configured to produce an ice body through direct contact with an evaporator coil and does not use cold air, or formed directly on a portion of the top portion of the storage tank using evaporator coils extending around a perimeter of the storage tank;
- pumping the water from the bottom portion of the storage tank;
- dispensing the water to a user upon a user command.

15. The method of claim 14, further comprising dispensing the at least one ice body directly to a user.

16. The method of claim 14, further comprising carbonating the water with a carbonator prior to dispensing the water, wherein the carbonator is an in-line, on demand carbonator.

17. The method of claim 14, further comprising filtering the water from the water source.

18. The method of claim 14, wherein evaporator coils are disposed solely on the top portion of the storage tank.

* * * * *